United States Patent [19]
Sasaki et al.

[11] Patent Number: 5,190,623
[45] Date of Patent: Mar. 2, 1993

[54] NUCLEAR FUEL REPROCESSING PLANT

[75] Inventors: Yuko Sasaki, Mito; Takashi Honda, Katsuta; Saburo Shoji; Shiro Kobayashi, both of Hitachi; Yasumasa Furutani, Katsuta, all of Japan

[73] Assignee: Hitachi, Ltd., Tokyo, Japan

[21] Appl. No.: 335,661

[22] PCT Filed: Jul. 13, 1988

[86] PCT No.: PCT/JP88/00694

§ 371 Date: Mar. 29, 1989

§ 102(e) Date: Mar. 29, 1989

[87] PCT Pub. No.: WO89/01224

PCT Pub. Date: Feb. 9, 1989

[30] Foreign Application Priority Data

Jul. 29, 1987 [JP] Japan .................................. 62-187560

[51] Int. Cl.$^5$ ................................................ C25C 1/24
[52] U.S. Cl. ...................................... 204/1.5; 204/228; 204/252; 204/302; 204/305; 204/415; 252/627; 422/159; 422/903
[58] Field of Search ................ 204/1.5, 228, 415, 252, 204/257, 302, 305; 423/2, 4; 252/627, 632; 422/159, 903

[56] References Cited

U.S. PATENT DOCUMENTS

| | | | |
|---|---|---|---|
| 3,352,645 | 11/1967 | Faugeras et al. | 252/627 |
| 3,361,651 | 1/1968 | Parkinson et al. | 204/1.5 |
| 3,616,275 | 10/1969 | Schneider et al. | 204/1.5 |
| 3,770,612 | 11/1973 | Covay et al. | 204/261 |
| 3,878,060 | 4/1975 | Kroebel | 204/1.5 |
| 3,948,735 | 4/1976 | Hayden et al. | 204/1.5 |
| 4,056,482 | 11/1977 | Schmieder et al. | 252/301.1 |
| 4,111,831 | 9/1978 | Maness | 422/12 |
| 4,206,073 | 6/1980 | Hesky et al. | 252/301.1 |
| 4,277,454 | 7/1981 | Long et al. | 423/320 |
| 4,313,800 | 2/1982 | Sondermann | 204/1.5 |
| 4,686,019 | 8/1987 | Ryan et al. | 204/1.5 |
| 4,741,810 | 5/1988 | Heilgeist et al. | 204/1.5 |
| 4,769,222 | 9/1988 | Hodgson et al. | 423/4 |
| 4,828,759 | 5/1989 | Hanulik | 252/628 |

*Primary Examiner*—Donald P. Walsh
*Assistant Examiner*—Ngoclan T. Mai
*Attorney, Agent, or Firm*—Antonelli, Terry, Stout & Kraus

[57] ABSTRACT

In a nuclear fuel reprocessing plant for processing a used nuclear fuel by a nitric acid solution, the present invention provides a nuclear fuel reprocessing plant characterized by including electrolytic reduction means for reducing the valence of oxidizing metal ions consisting of the nuclear fuel and dissolved in the nitric acid solution while they are kept under the ionic state. In a processing method of a nuclear fuel reprocessing plant for processing a used nuclear fuel by a nitric acid solution, the present invention provides also a corrosion-proofing method of a nuclear fuel reprocessing plant characterized in that electrolytic reduction is carried out so that the valence of oxidizing metal ions consisting of the nuclear fuel and dissolved in the nitric acid solution is reduced while the metal ions are kept under the ionic state and NOx gas is also generated. The invention is directed to provide a nuclear fuel reprocessing plant and its corrosion-proofing method which prevents corrosion of equipment without allowing the precipitation of corrosive metal ions in a nitric acid solution as the metals.

5 Claims, 5 Drawing Sheets

NUCLEAR FUEL REPROCESSING PLANT

TECHNICAL FIELD

This invention relates to a nuclear fuel reprocessing plant and its processing method effective for restricting corrosion of apparatuses in a nuclear fuel reprocessing process.

BACKGROUND ART

Reprocessing of a used nuclear fuel is made to recover and purify uranium and plutonium that can be used once again as a nuclear fuel and to remove and discard other radioactive substances. It is a wet process referred to as a "Purex process" that has been most commonly employed as the reprocessing method at present. This method comprises primarily a dissolving step of dissolving the used nuclear fuel in nitric acid, a co-decontamination step of separating uranium and plutonium from other radioactive substances by solvent extraction from this nitric acid solution, a distribution step of separating uranium and plutonium thus extracted, and a purification step of purifying uranium and plutonium, respectively. Besides these main steps, there are a step of recovering nitric acid that can be used for the main steps from the nitric acid solution containing nuclear fission products from the each step and a step of processing them as wastes. Therefore, almost all of the steps of the reprocessing process are exposed to the nitric acid solution. For this reason, stainless steel having a reduced carbon content (e.g. SUS304L, SUS316L or SUS310 system stainless steel), which is believed to be highly resistant to corrosion by nitric acid, has been employed in the past as countermeasure for corrosion from the material aspect. However, if any nuclear fission products are contained in this nitric acid solution, corrosiveness of the nitric acid solution is enhanced remarkably and the problem of corrosion occurs even for the stainless steel described above which exhibits sufficiently high corrosion resistance to nitric acid alone.

Generally, stainless steel has a protective oxide film on the surface in a system consisting of nitric acid alone and is under the passive state but if any chemical seed having high oxidation force such as Cr (VI) ion is contained therein, the oxidation force of the nitric acid solution is remarkably enhanced Accordingly, when the surface potential of the stainless steel becomes remarkably high and reaches a certain specific potential beyond the passive state potential, the metal dissolves as a high valency ion and there occurs a phenomenon that promotes vigorously corrosion, that is, so-called "over-passive state corrosion". In the nuclear fuel reprocessing plant, the nuclear fission products might exist in the nitric acid solution at all of these steps, though the concentration might change, and the Ru ion of the platinum group and the Ce ion of the rare earth element that can operate as the chemical seed having high oxidation force are contained. Furthermore, Cr and Fe ions as the corrosion products from the stainless steel itself might exist in nitric acid. Among others, these ions are likely to assume a high oxidation state at positions where the nitric acid concentration is high or the temperature of the nitric acid solution is high and they can exist as Ru(VIII), Ce(IV), Cr(VI) and Fe(III). Accordingly, it can be said that ordinary stainless steel is highly likely to cause the over-passive state corrosion. Among the problems of corrosion of stainless steel in the reprocessing plant, therefore, corrosion resulting from the co-existing chemical seeds having high oxidizability is believed important. In such a high oxidizing atmosphere, a material of a 17%Cr - 14%Ni - 4%Si system and a material of an 8%Cr - 20%Ni - 6%Si system, that have an increased Si content, have been proposed Journal of Japan Metallurgical Society, Vol 22, No. 4, pp. 320–322, 1983).

Japanese Patent Laid-Open No. 46380/1985 discloses a method which blows a NOx gas into a nitric acid solution as a method of preventing corrosion by the nitric acid solution in a nitric acid production plant, a nitric acid oxidation apparatus, a reprocessing plant of radioisotopes, and the like.

In the high Si system stainless steel such as described above, intergranular corrosion which is the characterizing feature of the over-passive state corrosion of ordinary stainless steel such as SUS304L system and the SUS310 system does not occur but the whole-surface corrosion occurs. However, corrosion resistance of such a steel is not always sufficient in a solution consisting of a medium or high concentration nitric acid alone, and excellent machinability and weldability of stainless steel will be lost if a large amount of Si is added. Accordingly, it has been difficult to obtain sufficient corrosion resistance without losing machinability in a highly oxidizing nitric acid environment by the improvement from the material aspect alone.

The method of blowing the NOx gas cannot easily control the reducing reaction and involves the possibility that the metal ions as the radioactive nuclei are precipitated as the metals. If such ions are precipitated as the metals or if a precious metal such as platinum is precipitated, corrosion of the materials of the apparatuses might be accelerated remarkably by galvanic corrosion so that processing apparatuses for such ions are necessary.

Incidentally, U.S. Pat. No. 3,891,741 proposes a method which causes the precipitation on the cathode surface by electrolytic reduction to recover nuclear fission products such as Ru but since this method is the method of precipitating the metals, it is not free from possible galvanic corrosion.

DISCLOSURE OF INVENTION

It is an object of the present invention to provide a nuclear fuel reprocessing plant having a corrosion-proofing system capable of preventing the corrosion of apparatuses without precipitating corrosive metal ions in a nitric acid solution as metals and the corrosion-proofing method thereof.

The present invention restricts the corrosion promotion action of nuclear fission products or corrosion generating substances that exist unavoidably in the nitric acid solution in a nuclear fuel reprocessing plant, and adjusts the surface potential of stainless steel always to a potential in a passive state region.

The present invention is based on the concept that the surface potential of stainless steel is raised remarkably and corrosion is promoted when Ru or Ce as the nuclear fission product or Cr or Fe of the corrosion product of the stainless steel itself is under the high oxidizing state in the nitric acid solution, in conjunction with the corrosion of the stainless steel in a reprocessing environment having used nuclear fuels dissolved by the nitric acid solution. The present invention effects electrolytic reduction to electrically reduce the ionic valence of metal ions such as Ru(VIII), Ce(IV), Cr(VI) or Fe(III) ion contained in the nitric acid solution while keeping them in the state of the metal ions and while preventing these radioactive oxidizing metal ions as the metals and thus to reduce these ions to ions having lower ionic valence and at the same time, the present invention generates NOx by electrolytic reduction to provide a reducing atmosphere and to prevent the Ru(III or II), Ce(III), Cr(III) or Fe(II) having the lower ionic valence from having a high oxidation number and eventually, the rise of the surface potential of the stainless steel. In this manner, the present invention finds out that corrosiveness of the nitric acid solution can be reduced drastically.

In a nuclear fuel reprocessing plant for processing a used nuclear fuel by a nitric acid solution, the present invention provides a nuclear fuel reprocessing plant which comprises a cathode electrode disposed in the nitric acid solution containing oxidizing metal ions consisting of the nuclear fuel dissolved in the nitric acid solution; an anode electrode disposed in the nitric acid solution consisting substantially of the nitric acid solution described above; a membrane for separating the nitric acid solution containing the oxidizing metal ions from the nitric acid solution consisting substantially of the nitric acid solution while connecting them electrically; and electrolytic reduction means for applying a constant potential or a constant current-between the cathode electrode and the anode electrode for reducing the valence of the metal ions while keeping them under the state of the metal ions, in such a manner as not to permit the precipitation of the metal ions as the metals. The present invention is suitable for processing the used nuclear fuel by vacuum boiling of the nitric acid solution.

The nuclear fuel reprocessing plant in accordance with the present invention comprises a fuel dissolution tank for dissolving a used nuclear fuel in a nitric acid solution; a waste liquor evaporating tank for concentrating a waste liquor after uranium and plutonium are separated from the nitric acid solution dissolving therein the nuclear fuel; an acid recovery evaporating tank for removing further the waste liquor from the nitric acid solution separated from the waste liquor evaporating tank; an acid recovery rectifier for purifying the nitric acid solution to obtain nitric acid to be used again for the main process; and a waste liquor storage tank for storing therein a radioactive waste liquor of a high or medium level; and the apparatus of the invention provides electrolytic reduction means for reducing the valence of the oxidizing metal ions consisting of the nuclear fuel dissolved in the nitric acid solution while keeping them in the ionic state to at least one of the constituents described above. Furthermore, the present invention provides vacuum boiling means for a nitric acid solution to at least one of the waste liquor evaporating tank, the acid recovery evaporating tank and the acid recovery rectifier.

Since the present invention can prevent overpassive state corrosion of the stainless steel due to the oxidizing metal ions in the reprocessing nitric acid solution, the present invention can prevent the troubles of the fuel dissolution tank, the waste liquor evaporating tank, the waste liquor concentration tank, the waste liquor storage tank, the nitric acid recovery evaporating tank and the nitric acid recovery rectifier, that are likely to be placed under the particularly severe corrosive environment, due to corrosion, can therefore stabilize the operation of the nuclear fuel reprocessing plant and can improve its reliability.

The gist of the present invention resides also in a processing method of a nuclear fuel reprocessing plant for processing a used nuclear fuel by a nitric acid solution, which method is characterized in that the valence of oxidizing metal ions consisting of the nuclear fuel dissolved in the nitric acid solution is reduced while keeping them under the ionic state and without permitting their precipitation as the metals to such an extent as to generate a NOx gas.

The present invention is also characterized in that the oxidizing metal ions consisting of the nuclear fuel dissolved in the nitric acid solution are electrolytically reduced at a potential lower than an oxidation-reduction potential of the metal ions without permitting the precipitation of these metal ions as the metals.

In a corrosion-proofing method of equipment by a nitric acid solution containing oxidizing metal ions, the present invention relates also to a corrosion-proofing method of equipment by a nitric acid solution characterized in that the oxidizing metal ions are electrolytically reduced to such an extent as not to permit their precipitation as the metals in the same way as described above. The present invention can be applied to corrosion proofing of a nitric acid production plant by ammonia oxidation, a nitric acid oxidation apparatus of organic compounds, an apparatus for recovering metals from scraps of semiconductor materials, and a surface cleaning apparatus of stainless steel.

In these corrosion-proofing method and apparatus, the present invention is effective for processing which employs vacuum boiling of the nitric acid solution.

Figure 1:
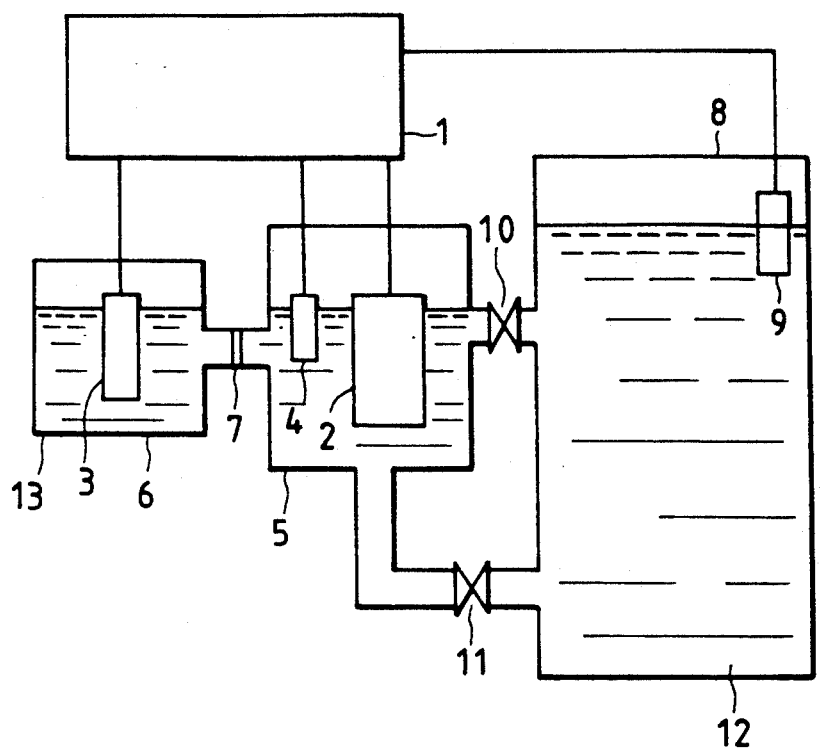
FIG. 1 is a structural view showing an example of an electrolytic reduction apparatus in the present invention.

When an apparatus or apparatuses handling a nitric acid solution containing at least one of Ru(VIII), Ce(IV), Cr(VI) and Fe(III) are made of stainless steel, the present invention adjusts an external power source so that a cathode electrode potential can be kept within the range of the reduction potential of the ions in the nitric acid solution or the current necessary for reducing the ions can be supplied, and these ions are reduced on the surface of the cathode electrode and their ionic valence is reduced. This reaction can be expressed by the following formulas (1) to (5):

$$Ru(VIII) + 5e \rightarrow Ru(III) \quad (1)$$

$$Ru(VIII) + 6e \rightarrow Ru(II) \quad (2)$$

$$Ce(IV) + e \rightarrow Ce(III) \quad (3)$$

$$Cr(VI) + 3e \rightarrow Cr(III) \quad (4)$$

$$Fe(III) + e \rightarrow Fe(II) \quad (5)$$

Accordingly, when the electrolysis is carried out, the potential of the working electrode is set to be lower than the oxidation-reduction potential of the reaction expressed by the formulas (1) to (5).

The electrolytic apparatus for the electrolytic reduction of the nitric acid solution consists of a cathode electrode, an anode electrode, a reference electrode and a potential controller. The cathode electrode or the anode electrode is preferably an inert electrode and examples of the inert electrode include precious metal electrodes such as Pt, Au and Pt-coating Ti electrodes and a carbon electrode.

Examples of the reference electrode include an Ag-/AgCl electrode, a Hg/Hg$_2$Cl$_2$ electrode, or the like. A potentiostat is an example of the potential controller.

The following two methods may be employed as the definite method of electrolytic reduction of the nitric acid solution. The first method measures the concentration of the Ru(VIII), Ce(IV), Cr(VI) and Fe(III) ions in the nitric acid solution and supplies the current necessary for reducing them to Ru(III or II), Ce(III) and Cr(III). However, quantitative analysis including the valence of the chemical seeds such as Ru(VIII) and Ce(IV) is difficult in many cases. Therefore, the second method measures the surface potential of the stainless steel as the object of corrosion and conducts electrolytic reduction. Since the present invention causes fundamentally the shift of the surface potential of the stainless steel in the over-passive state region to the passive state region, the invention determines in advance the passive state regions of the stainless steel in pure nitric acid having various concentrations and at various temperatures through the measurement of polarization curves or the like, monitors the surface potential of the stainless steel in the nitric acid solution, starts electrolytic reduction when the nitric acid solution exceeds the passive state potential when it is assumed to be pure nitric acid, and stops electrolytic reduction when the nitric acid solution returns to the passive state region. In the case of the SUS310 system stainless steel, for example, a sufficient corrosion-proofing effect can be obtained if the surface potential of the stainless steel is kept within the range of from 0.70 to 0.90 V (Ag/AgCl electrode as the object) for a 9 mol/l nitric acid at 80° C.

In the nuclear fuel reprocessing plant, there is the high possibility that corrosive nuclear fission products or corrosive products from the stainless steel itself are contained, or high concentration or high temperature of the nitric acid will create particularly severe corrosive environment. In such a case, it is effective to make corrosion-proofing in accordance with the method of the present invention. More definitely, the present invention is effective for a dissolution tank, a waste liquor evaporating tank, a waste liquor concentration tank and a waste liquor storage tank that handle large quantities of a high temperature nitric acid solution containing nuclear fission products, or a nitric acid recovery evaporating tank and a nitric acid recovery rectifier in which nuclear fission products are most likely to exist unavoidably and which handle a nitric acid solution having a medium to high concentration and at a medium to high temperature. In order to reduce the oxidizing metal ions such as Ru, Ce, Cr and Fe ions as the corrosion promotion factors and to prevent re-oxidation by the resulting NOx when the apparatus using nitric acid is made of the stainless steel, the present invention places the cathode electrode and the reference electrode into the nitric acid solution inside the main body of the apparatus handling nitric acid or inside a side chamber bypassed from the main body, places the anode electrode in the side chamber equipped with a membrane through a bypass from the main body in such a manner as to communicate electrically with the nitric acid solution inside the main body and conducts electrolytic reduction of the nitric acid solution inside the main body by use of the external potential controller. Here, the surface potential of the stainless steel in the nitric acid solution is monitored by putting into the nitric acid solution a monitor electrode made of the same stainless material as that of the apparatus or using it as the apparatus main body monitor electrode so that when the surface potential exceeds the passive state potential under that environment, the external potential controller is operated to start electrolytic reduction of the nitric acid solution and when the surface potential of monitor electrode returns to the passive state potential, the electrolytic reduction is terminated. In this manner, the electrolytic reduction can be made economically.

BEST MODE FOR CARRYING OUT THE INVENTION

Embodiment 1

FIG. 1 shows the outline of the construction of the electrolytic reduction apparatus for practicing the present invention. A nitric acid solution 12 containing oxidizing metal ions is supplied to a cathode electrolytic cell 5 from a nuclear fuel reprocessing equipment 8 through a liquid supply port 10. The cathode electrolytic cell 5 is separated from an anode electrolytic cell 6 by a membrane 7, and a cathode electrode 2 and a reference electrode 4 are disposed in the cathode cell 5. A non-consumable anode electrode 3 is disposed in the anode electrolytic cell 6. Electrolysis of a nitric acid solution 12 to be processed is carried out by adjusting the current value with the anode electrode 3 by the potential controller 1 so that the electrode potential of the cathode electrode 2 relative to the reference electrode 4 reaches a set value. The set value of the reference potential is selected to such a value that the oxidizing metal ions do not substantially precipitate on the cathode electrode 2. Valence of the metal ions is reduced while they are kept under the ionic state and corrosion of various apparatuses by the nitric acid solution is prevented. The treated liquor after electrolytic reduction is returned again to the reprocessing equipment 8 through a discharge port 11. Thus processing can be made continuously while circulating the treating solution. The materials of the cathode electrode 2 and anode electrode 3 must be non-consumable, corrosion-resistant and highly electrically conductive. Examples of the electrodes are metal electrodes such as a Pt electrode, a Pt-coating Ti electrode, an Au electrode and Pd electrode, and carbon electrode besides the metal electrodes. Though Ag/AgCl electrode or Hg/Hg$_2$Cl$_2$ electrode can be used for the reference electrode 4, a ceramic electrode is more preferred to glass electrode from the aspect of resistance to radioactivity. The anode cell 6 is filled with pure nitric acid 13 and the membrane 7 is such that the inflow of the metal ions into the anode cell 6 can be prevented. A potential monitor electrode 9 is disposed in the reprocessing equipment 8 so as to monitor its surface potential. When the surface potential exceeds the set value, the potential controller 1 operates and electrolysis is carried out. In this manner, corrosion-proofing can be made efficiently for the reprocessing equipment 8. It is most optimal to use the same material as that of the reprocessing equipment for the monitor electrode 9. Moreover, the reprocessing equipment 9 itself may be used as the cathode cell.

According to this embodiment, corrosion of the reprocessing equipment can be prevented without using any additives from outside. Furthermore, since the oxidizing metal ions of the used nuclear fuel by nitric acid are not precipitated as the metals, there can be obtained a great effect that corrosion-proofing can be made without any maintenance. It is difficult to handle the oxidizing metal ions because they have radioactivity. Hence, the present invention provides the great effect in that corrosion-proofing can be made without permitting the precipitation of these ions as the metals.

Hereinafter, the present invention will be described with reference to definite experimental result.

Corrosion tests were carried out for 100 hours for austenite stainless steels having chemical compositions shown in Table 1 in various nitric acid solutions simulating a used nuclear fuel reprocessing process. First of all, the corrosion rate was measured in pure nitric acid having a concentration of from 2 to 14 mol/l and at a temperature from 40° C. to a boiling point. Next, at least one of Ru(VIII), Ce(IV) and Cr(VI) was added in a concentration range of 0 to 0.5 mol/l to pure nitric acid under the respective condition and the corrosion rate was measured. Furthermore, the corrosion rate was measured while each the nitric acid solution containing these oxidizing metal ions was subjected to electrolytic reduction.

TABLE 1

| Composition Material | C | Si | Mn | P | S | Cr | Ni | Nb |
|---|---|---|---|---|---|---|---|---|
| SUS304L-1 | 0.009 | 0.59 | 1.11 | 0.032 | 0.005 | 18.88 | 10.49 | — |
| SUS304L-2 | 0.018 | 0.45 | 0.82 | 0.015 | 0.003 | 18.31 | 9.96 | — |
| SUS304L-3 | 0.018 | 0.48 | 0.83 | 0.008 | 0.002 | 18.62 | 9.64 | — |
| SUS310Nb | 0.010 | 0.26 | 0.67 | 0.007 | 0.002 | 24.40 | 20.70 | 0.24 |

For the electrolytic reduction of the solution, Pt electrodes were used for the cathode electrode 2 and the anode electrode 3 shown in FIG. 1, an Ag/AgCl electrode for the reference electrode 4 and a potentiostat for the potential controller 1. Though the current and voltage of the cathode electrode 2 were different depending on the condition of the nitric acid solution at the time of electrolytic reduction, they were adjusted with the quantity of generation of NOx as the scale. As to the corrosion rate, the change with time at every 25 hours was measured and the absolute value of the corrosion rate under the condition corresponding to each of the case of the nitric acid solution to which the oxidizing metal ions were added and to the case where the nitric acid solution containing the oxidizing metal ions was electrolytically reduced, by use of the value of the corrosion rate at the passage of 100 hours after each testpiece was dipped into pure nitric acid, as the reference. The result is shown in FIG. 2.

Figure 2:
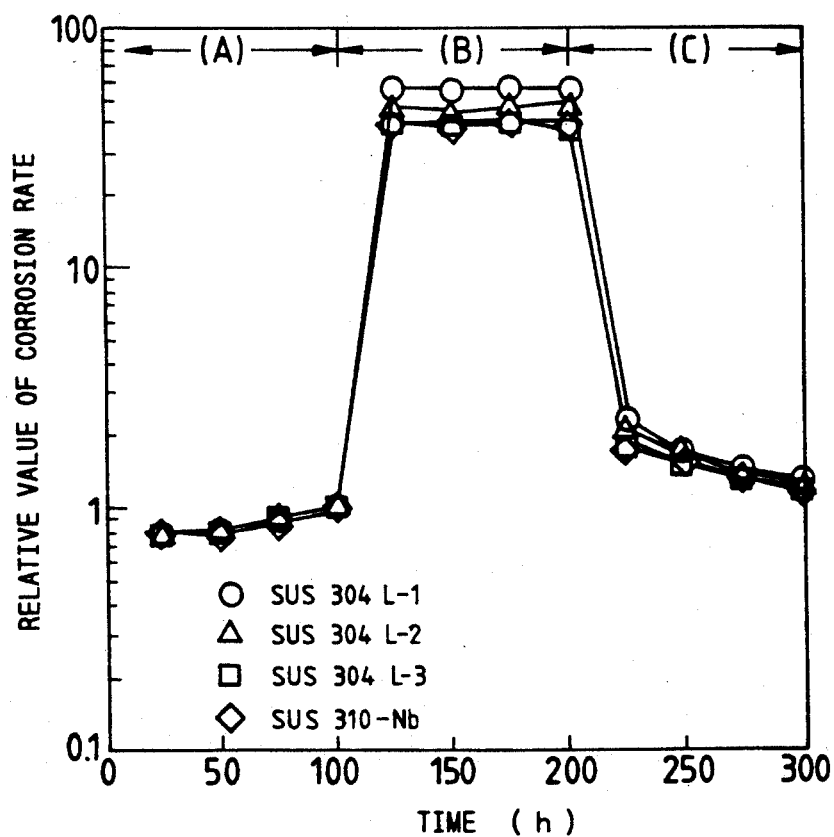
FIG. 2 is a diagram showing the relation between a corrosion rate and a time when electrolytic reduction is carried out for various alloys in a nitric acid solution (range A), in a nitric acid solution containing oxidizing metal ions (range B) and in a nitric acid solution containing oxidizing metal ions which is electrolytically reduced (range C)

FIG. 2 shows the corrosion rates of each testpiece shown in Table 1 in pure nitric acid of 9 mol/l at boiling temperature (110° C.), in a nitric acid solution prepared by adding 0.001 mol/l of Ru(VIII), Ce(IV) and Cr(VI), respectively, to this pure nitric acid and in a nitric acid solution obtained by electrolytically reducing this nitric acid solution containing Ru(VIII), etc. As the method of electrolytic reduction, it is convenient to select the potential within the range where Ru(VIII) and the like contained in the nitric acid solution can be reduced to the ions of a lower order and moreover, these ions are not precipitated as the metals, because such a method does not require the replacement of the electrodes and the like. Accordingly, the potential of the cathode electrode in this nitric acid solution was controlled from 0.55 V to 0.23 V (with reference to the Ag/AgCl electrode). As an example, the following represents the case where the potential of the cathode electrode was set to 0.30 V (with reference to the Ag/AgCl electrode). The range (A) in FIG. 2 represents the absolute value of the corrosion rate in pure nitric acid, the range (B) does that in the nitric acid solution to which Ru(VIII) and the like was added in the amounts described above and the range (C) does that in the case where the nitric acid solution containing Ru(VIII) and the like was electrolytically reduced while the cathode electrode potential was set to 0.30 V (with reference to Ag/AgCl electrode).

Electrolytic reduction in this embodiment was carried out while the metal ions was kept under the ionic state and did not precipitate as the respective metals.

As can be seen from FIG. 2, the corrosion rate (the range (B)) by nitric acid containing the oxidizing metal ions such as Ru(VIII) is by about 100 times greater than the corrosion rate (the range (A)) in pure nitric acid and it can thus be understook that the presence of the oxidizing metal ions greatly increases the corrosion rate. However, the corrosion rate (C) in the nitric acid solution which is electrolytically reduced in accordance with the present invention drops drastically down to about 1/100 times and the invention provides a great corrosion-proofing effect. In accordance with the present invention, any metals do not precipitate on the cathode electrode due to the reduction of the oxidizing metal ions and since reduction is effected by the generation of NOx, the reducing effect becomes further greater. It is therefore believed that the corrosion quantity can be reduced as described above.

The electrolytic reduction apparatus must be controlled to a potential at which the oxidizing metal ions do not precipitate, but this potential is set to a suitable value because it varies with the kinds of metals, the concentration of nitric acid, its temperature, and so forth.

Embodiment 2

In this embodiment electrolytic reduction was carried out by use of the electrolytic reduction apparatus shown in FIG. 1 in the same way as in Embodiment 1 while the reprocessing equipment 8 was boiled at a reduced pressure and the potential was being controlled by monitoring though a potential monitor, in order to prevent the oxidizing metal ions from precipitating on the cathode electrode 2. Though not shown in the drawing, an evacuation apparatus was disposed inside the space of the reprocessing equipment 8 at its portion where the nitric acid solution did not exist, and a heater was further disposed to heat the nitric acid solution. In this embodiment vacuum boiling was effected at 100 Torrs and 60° C. and the corrosion tests were carried out for the nitric acid solution which was subjected to electrolytic reduction and for the nitric acid solution which was not, to determine the corrosion quantity in the same way as in Embodiment 1. As a result, the corrosion quantity was found to be about 1/10. It was thus clarified that corrosion-proofing could be attained remarkably in the same way as in Embodiment 1.

Embodiment 3

Figure 3:
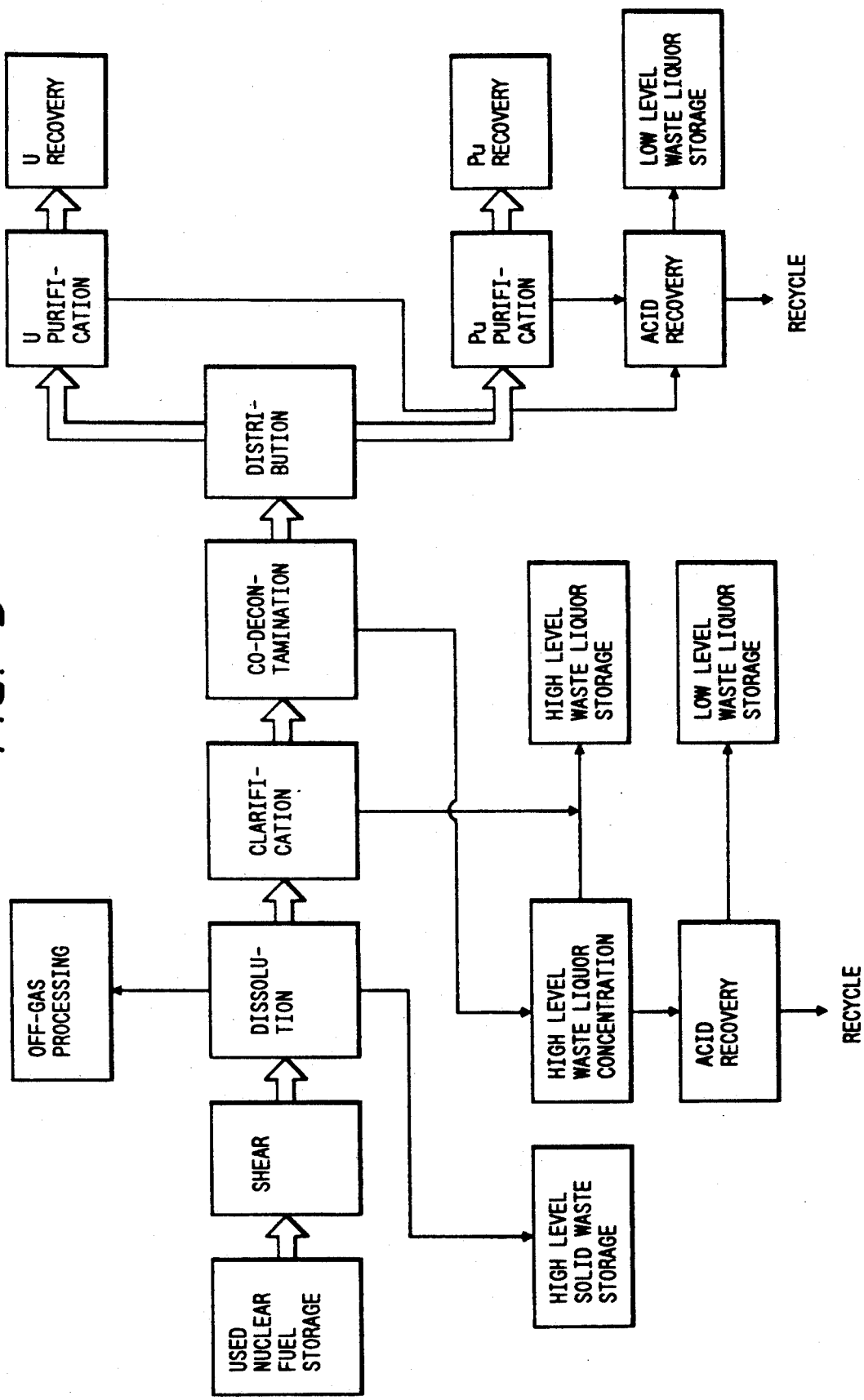
FIG. 3 is a block diagram showing the process steps in a reprocessing plant of a used nuclear fuel in accordance with the present invention.
Figure 4:
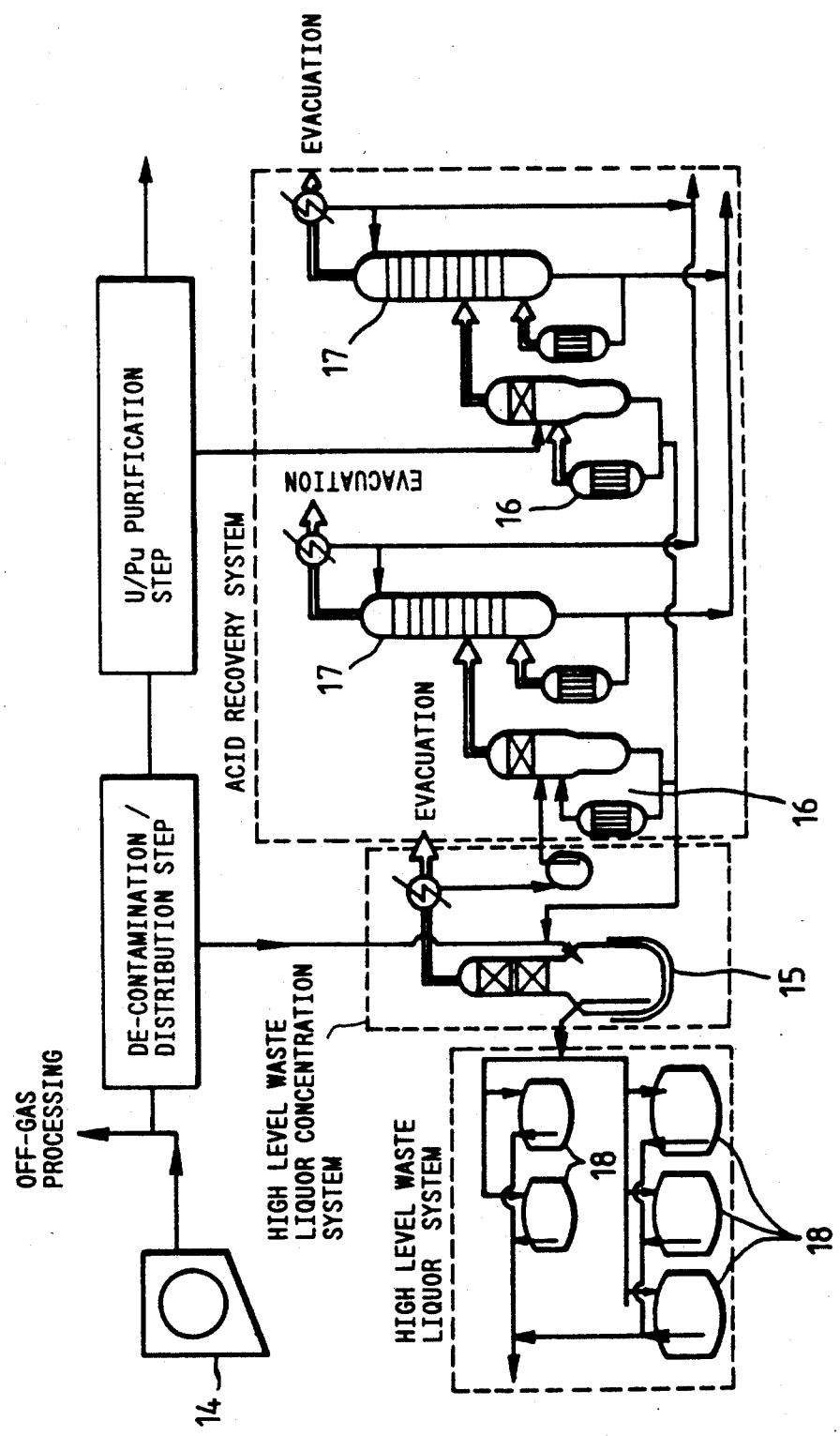
FIG. 4 is a system diagram of each apparatus in the reprocessing system.

FIG. 3 is a system block diagram of the nuclear fuel reprocessing plant in accordance with the present invention and FIG. 4 is a structural view consisting of various apparatuses. The used nuclear fuel is processed through the steps shown in the block diagram.

The used nuclear fuel was put into a reservoir (not shown), stored for a considerable period of time and processed after radioactivity in the fuel had attenuated. In the case of the fuel for the stainless steel and Zircaloy coating pipe of a light-water reactor as the used nuclear fuel whose radioactivity had attenuated, the fuel was cut into small pieces, only the oxide fuel was dissolved in the dissolution tank at the dissolving step and the coating pipe was removed as the solid waste. Dissolution was carried out in boiling nitric acid. The fuel solution was then sent to the co-decontamination step, where uranium and plutonium were separated from the solution. This separation was effected by extraction with an organic solvent and uranium and plutonium shifted into the organic phase while the nuclear fission products remained in the aqueous phase. This aqueous phase was sent to a high radioactive waste liquor processing step.

The high radioactive waste liquor after the separation of uranium and plutonium was sent to a waste liquor evaporating tank 15 for concentration. The waste liquor was further removed from the nitric acid solution separated from the evaporating tank 15 and sent to the evaporating tank 16 for recovering nitric acid. This nitric acid solution was sent to the acid recovery rectifier 17 for purifying nitric acid to be used again, and nitric acid thus recovered was used again. The residue after recovery of the nitric acid solution was stored in a waste liquor tank for storing radioactive waste liquors of medium and high levels. Reference numeral 18 represents a high level waste liquor storage tank.

Each of the fuel dissolution tank 14, waste liquor evaporating tank 15, acid recovery evaporating tank 16, acid recovery rectifier 17 and waste liquor 18 contained the oxidizing metal ions of the nuclear fission products and corrosion was promoted therein. Accordingly, constant voltage or current control means or monitor means and the electrolytic reduction apparatus for electrolytically reducing these metal ions to ions of lower were provided to each of these apparatuses. The apparatus shown in FIG. 1 was used as the electrolytic reduction apparatus. Since each of these apparatuses was a container made of austenite system stainless steel for storing the nitric acid solution, the cathode electrode for reducing the metal ions was disposed in the nitric acid solution.

Since the electrolytic reduction apparatus was disposed in each of these apparatuses, the quantity of corrosion was reduced drastically in each apparatus and corrosion-proofing was made for the apparatus. Furthermore, since the oxidizing metal ions as the nuclear fission products did not precipitate on the electrode, processing for the precipitate was not necessary, and maintenance-free corrosion proofing could be conducted. Handling of the oxidizing metals as the nuclear fission products becomes the problem because they are radioactive, and their removal needs a specific apparatus. However, this embodiment eliminates such a need.

Figure 5:
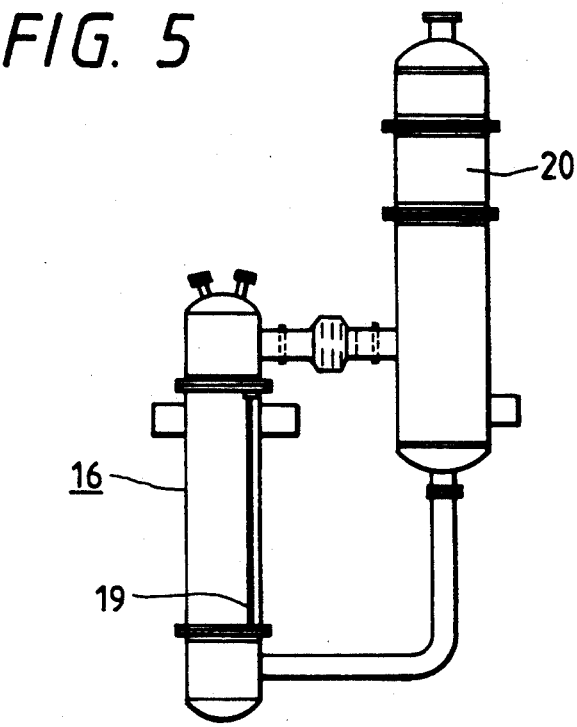
FIG. 5 is a structural view of an acid recovery evaporating tank.

FIG. 5 shows the structure of the acid recovery evaporating tank 16. A large number of heat transfer pipes 19 for heating nitric acid are disposed in the tank 16 and a gas-water separator 20 is disposed therein, too.

Figure 6:
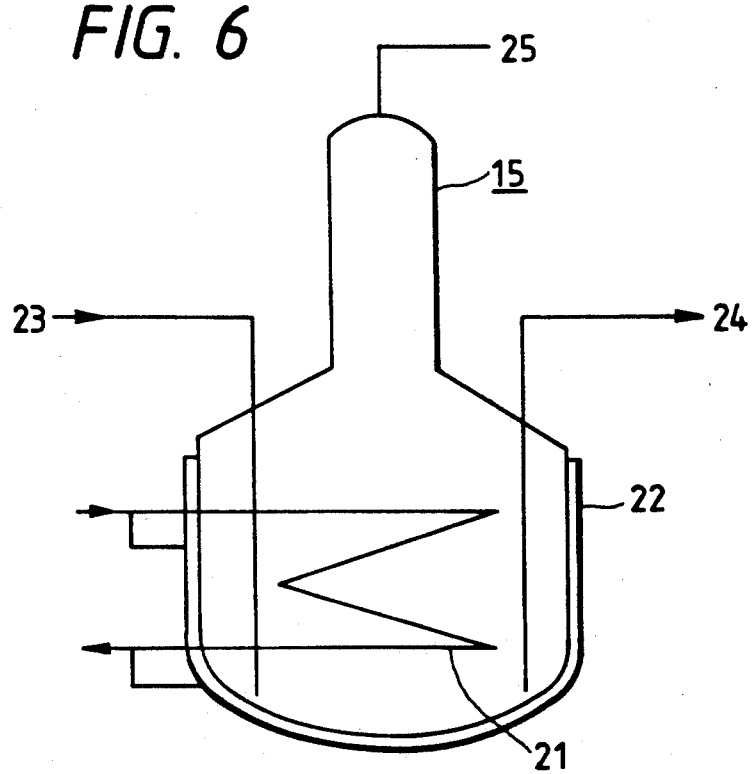
FIG. 6 is a structural view of a waste liquor evaporating tank.

FIG. 6 shows the structure of the waste liquor evaporating tank 15. There are disposed a heating coil 21 using the inflowing heating medium, an external heating jacket 22, a nitric acid solution inlet 23, its outlet 24 and a gas outlet 25.

Figure 7:
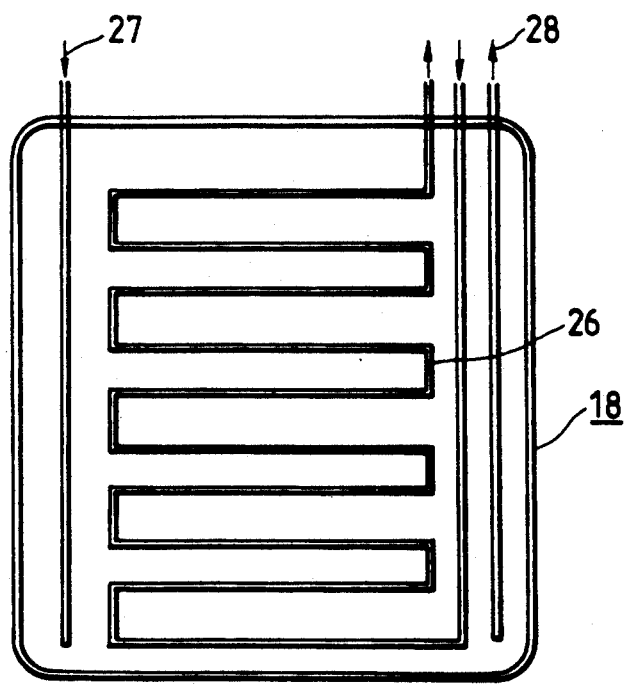
FIG. 7 is a structural view of a waste liquor storage tank.

FIG. 7 shows the structure of the waste liquor tank 18, and a cooling pipe 26 for cooling by use of a refrigerant, a nitric acid solution inlet 27 and its outlet 28 are disposed in the tank.

Figure 8:
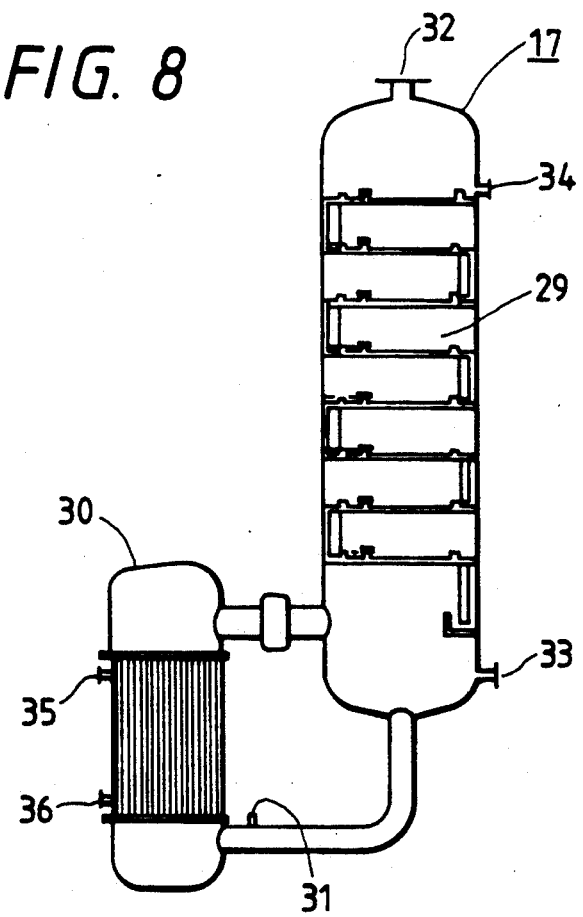
FIG. 8 is a structural view of an acid recovery rectifier.

FIG. 8 shows the structure of the acid recovery rectifier 17, and a rack 29, a heating unit 30, a nitric acid solution inlet 31, a gas outlet 32, a concentrated liquor outlet 33, a reflux outlet 34, a heating medium inlet 35 and a heating medium outlet are disposed therein.

As described above, the electrolytic reduction apparatus is disposed for each of these apparatuses. The nitric acid solution is communicated between the electrolytic reduction apparatus and each of these apparatuses through the pipe.

Furthermore, evacuation means are provided to the waste liquor evaporating tank 15 and the acid recovery rectifier 17 as shown in FIG. 4 and the solution can be boiled in vacuo and the reprocessing plant with less corrosion can be accomplished.

Industrial Applicability

The present invention makes it possible to prevent corrosion of the nuclear fuel reprocessing equipment without allowing the precipitation of the oxidizing metal ions. Therefore, corrosion-proofing of the reprocessing equipment can be made without the need of specific processing of the waste as the radioactive substances. Since the stop of operation due to corrosion can be prevented in advance, the operation factor of the reprocessing plant can be improved.

We claim:

1. In a method for operating a nuclear fuel reprocessing plant comprising processing a used nuclear fuel by vacuum boiling of a nitric acid solution, the improvement comprising a corrosion-proofing method including reducing the valence of oxidizing metal ions selected form the group consisting of Ru (VIII), Ce (IV), Cr(VI) and Fe (III), dissolved in said vacuum boiling nitric acid solution, by electrolytic reduction while said metal ions are kept in the ionic state and generating NOx gas.

2. In a method for processing a nuclear fuel reprocessing plant comprising processing a used nuclear fuel by vacuum boiling of a nitric acid solution, the improvement comprising a corrosion-proofing method including reducing the valence of oxidizing metal ions selected from the group consisting of Ru (VIII), Ce (IV), Cr (VI) and Fe (III), dissolved in said vacuum boiling nitric acid solution by electrolytic reduction at a potential lower than an oxidation-reduction potential of said oxidizing metal ions while said metal ions are kept in the ionic state.

3. A corrosion-proofing method for equipment containing oxidizing metal ions and exposed to vacuum boiling of a nitric acid solution comprising carrying out electrolytic reduction for reducing the valence of said metal ions while said metal ions are kept under the ionic state.

4. A nuclear fuel reprocessing plant comprising
means for processing a used nuclear fuel by vacuum boiling of a nitric acid solution, and electrolytic reduction means for lowering the valence of oxidizing metal ions selected form the group consisting of Ru (VIII), Ce (IV), Cr (VI) and Fe (III), dissolved in said vacuum boiling nitric acid solution, while keeping said metal ions in the ionic state;

means for measuring a surface potential of stainless steel in said nuclear fuel reprocessing plant exposed to said nitric acid solution; and control means for controlling said electrolytic reduction means in accordance with a measured value of said surface potential.

5. A nuclear fuel reprocessing plant according to claim 4, wherein said control means activates said electrolytic reduction means when said surface potential of said stainless steel is in an over-passive state region and terminates operation of said electrolytic reduction means when said surface potential of said stainless steel is in the passive state region.

* * * * *